Patented Nov. 18, 1924.

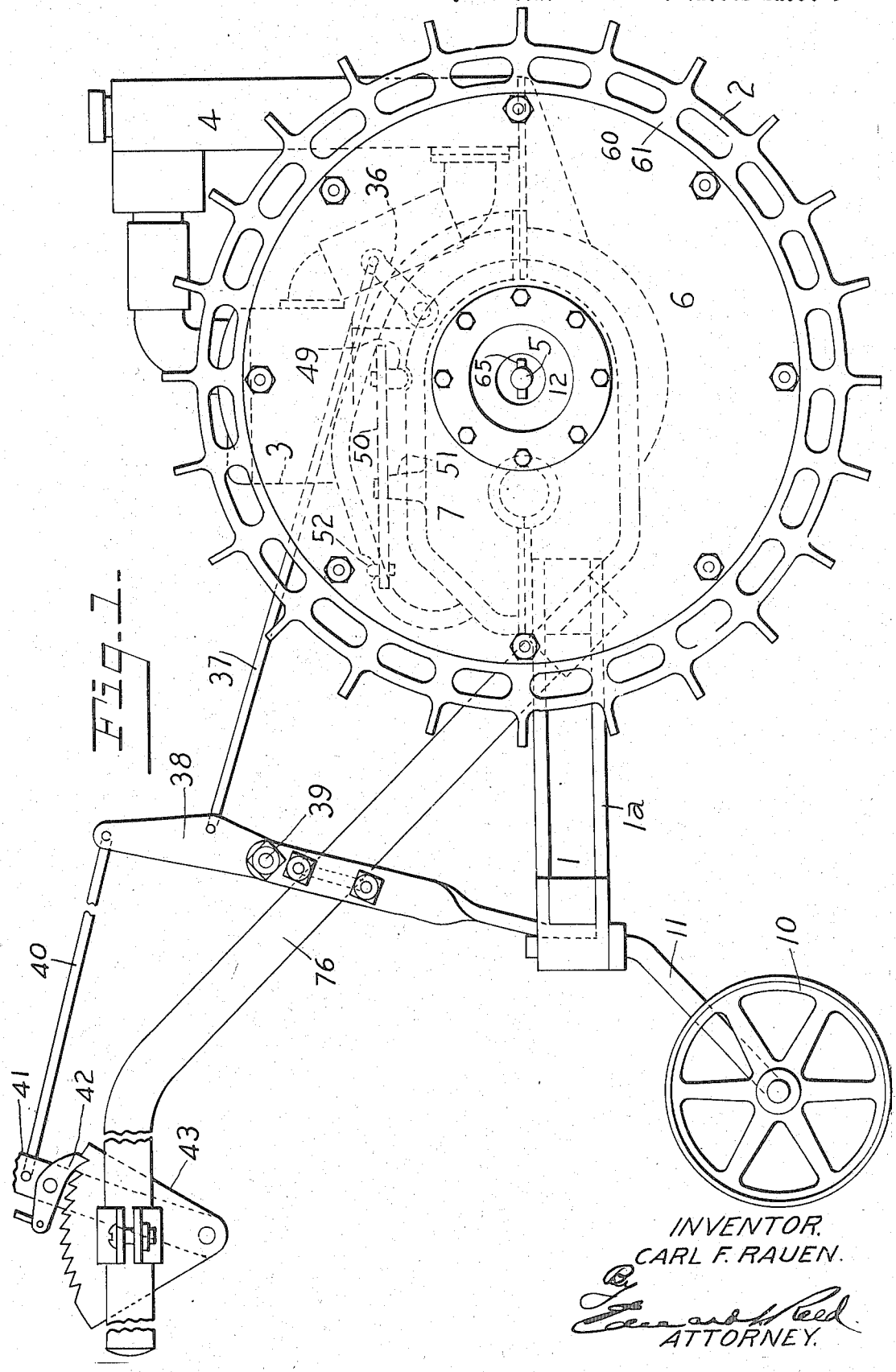

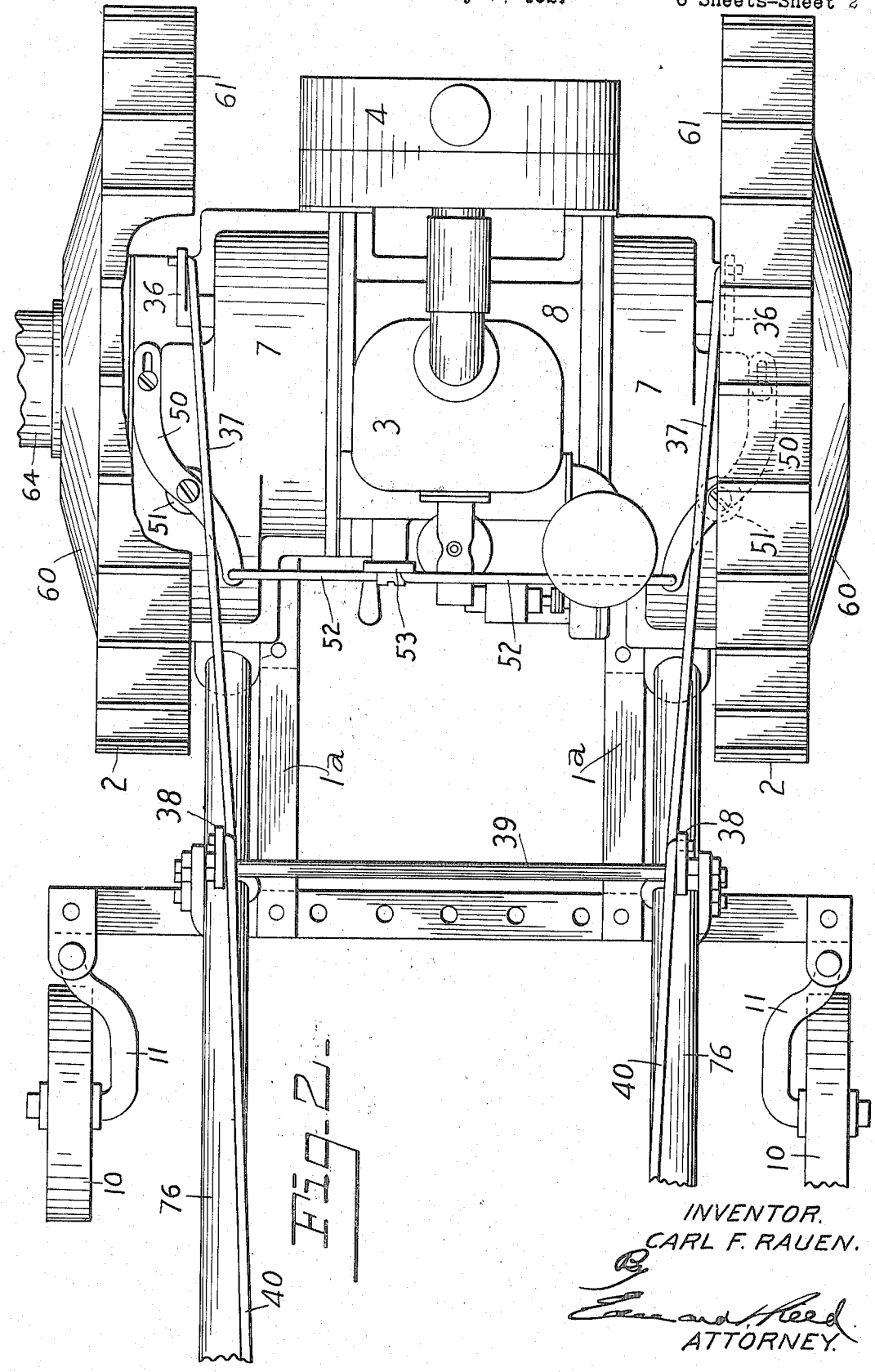

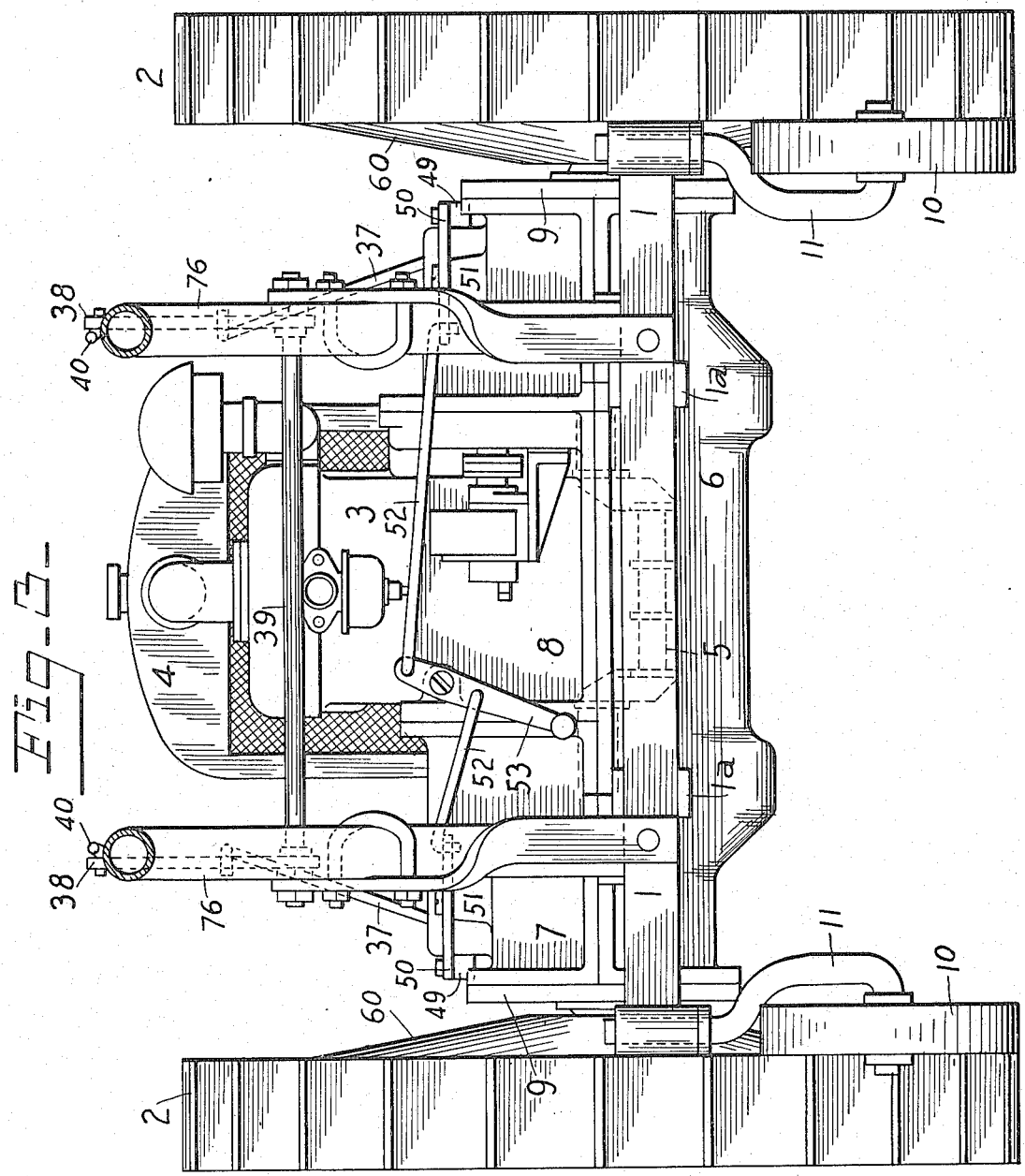

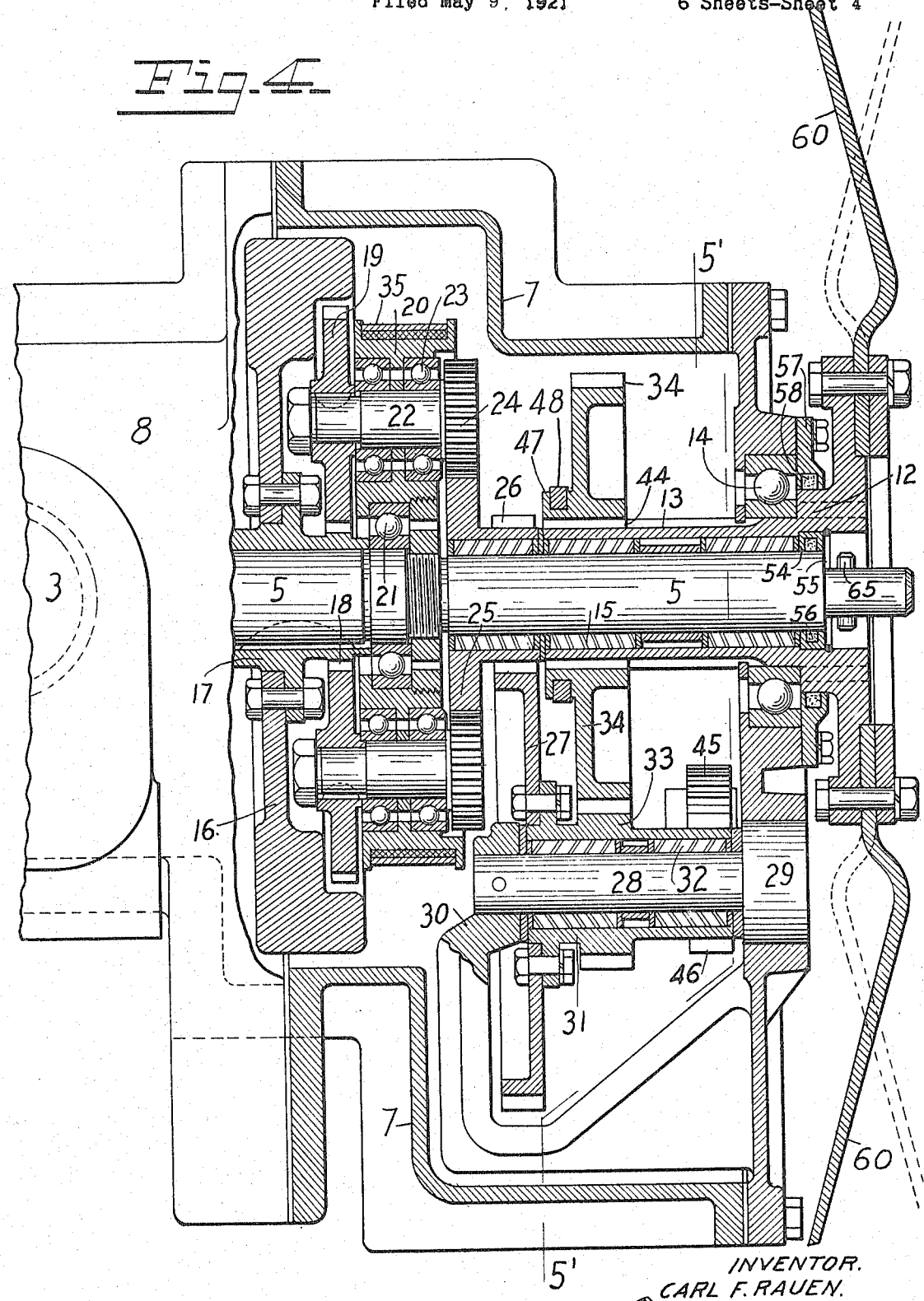

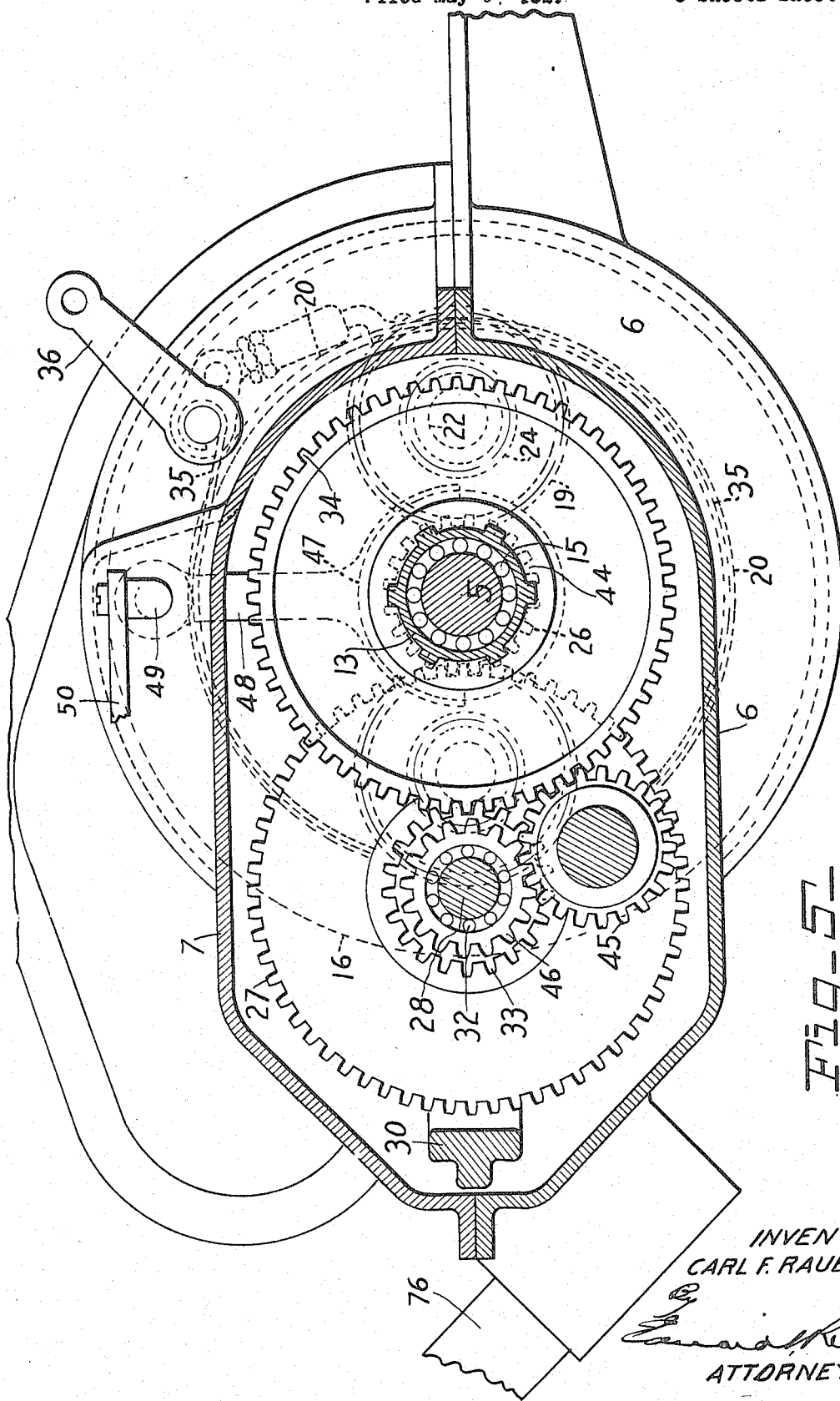

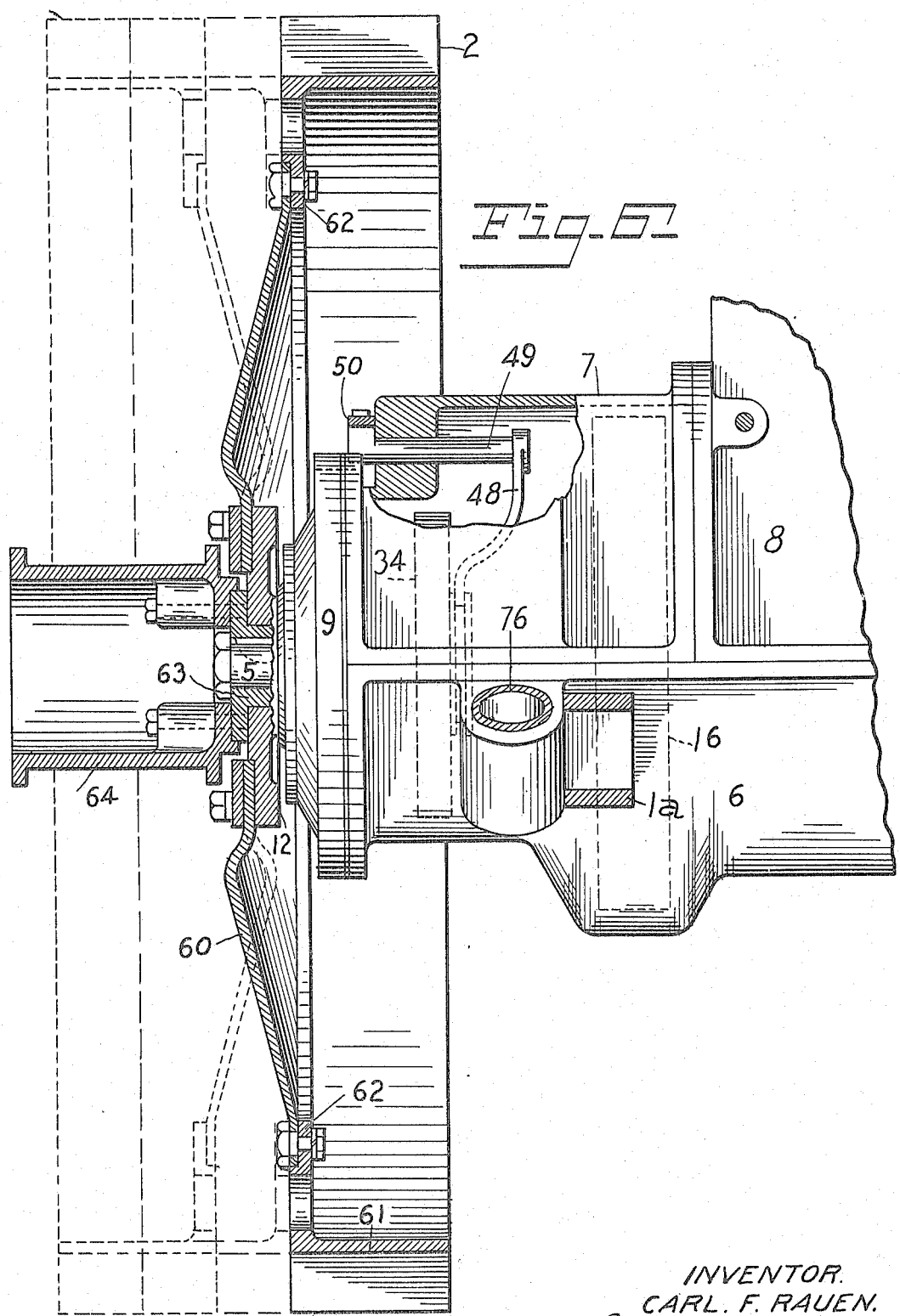

1,515,883

UNITED STATES PATENT OFFICE.

CARL F. RAUEN, OF DAYTON, OHIO, ASSIGNOR TO HAROLD S. SHELTON, OF DAYTON, OHIO.

TRACTOR.

Application filed May 9, 1921. Serial No. 467,897.

*To all whom it may concern:*

Be it known that I, CARL F. RAUEN, a citizen of the United States, residing at Dayton, in the county of Montgomery and State of Ohio, have invented certain new and useful Improvements in Tractors, of which the following is a specification, reference being had therein to the accompanying drawing.

This invention relates to tractors and more particularly to the small tractor behind which the operator walks and which is controlled by means of handles.

One object of the invention is to provide a tractor of this type which can be very easily handled in the field.

To this end it is a further object of the invention to provide such a tractor which will turn in either direction under its own power and which will be reversible.

A further object of the invention is to provide such a tractor in which the various parts will be readily accessible.

A further object of the invention is to provide such a tractor in which the width of the tread may be varied to accommodate it to different field conditions, such as the different spacing of rows in the field.

Other objects of the invention will appear as the mechanism is described in detail.

In the accompanying drawings Fig. 1 is a side elevation of a tractor embodying my invention, with the handles partly broken away; Fig. 2 is a plan view of such a tractor; Fig. 3 is a rear elevation of the same with the handles broken away; Fig. 4 is a horizontal sectional view, partly broken away, taken centrally through one of the wheels and the transmission mechanism therefor; Fig. 5 is a vertical sectional view taken on the line 5—5 of Fig. 4; and Fig. 6 is a sectional view of one of the wheels and the pulley attachment.

In these drawings I have illustrated one embodiment of my invention and have shown the same as comprising a main frame 1 supported at its opposite sides by traction wheels 2. Mounted upon this frame is an internal combustion engine 3 provided with the usual radiator 4 and connected with a crank shaft 5. The main frame may be of any suitable construction and in the present instance the forward portion thereof is in the form of a casting arranged beneath the engine and constituting the oil pan 6, or lower part of the crank casing, and the rear portion comprises side members $1^a$, rigidly secured to the part 6 and connected one to the other by a transverse member. The lateral end portions of the casting 6 form the lower portion of oil tight casings adapted to receive transmission gearing, to be hereinafter described. These gear casings further comprise top plates 7 rigidly secured to the casting 6 and at their inner ends secured to the upper portion of the crank case, which forms part of the engine frame, as shown at 8. The ends of the casing are closed by end plates 9 bolted or otherwise rigidly secured to the flanges at the ends of the upper and lower portions thereof. The rear portion of the main frame 1 is supported by castor wheels 10 which are mounted upon downwardly and rearwardly extending arms 11 pivotally mounted in the rear portion of the frame 1, the axes of the arms 11 being spaced such a distance from the traction wheels 2 that the castor wheels may move bodily about the respective axes without coming in contact with the traction wheels, thereby greatly facilitating the turning of the tractor.

Interposed between the crank shaft and the respective wheels 2 are separate transmission mechanisms of such a character that they can be independently controlled to cause power to be applied to either wheel alone or unequally to both wheels, thereby enabling the tractor to be turned in either direction under its own power. Further, these transmission mechanisms are reversible, thereby permitting the tractor to be operated in a reverse direction, which is often very desirable to clear an obstruction or to enable a turn to be made. While this transmission mechanism may take various forms I have illustrated one that is highly efficient and very compact and simple in its construction. As here shown, each of the wheels 2 comprises a central portion or a hub 12 which is provided with an inwardly extending sleeve, or elongated hub, 13, said sleeve being journaled in a bearing 14 in the end plate 9 of the adjacent gear casing, and in the present instance I have shown these bearings as antifriction bearings. The ends of the crank shaft 5 extend laterally through the respective gear casings and are journaled in the sleeves, or elongated hubs, 13 of the wheels, preferably by means of antifriction bearings 15, whereby the shaft is permitted to rotate independently of the wheels. Inasmuch as the two transmission mechanisms are identical I will now proceed to describe one of them and it will be understood that this description applies to both. Rigidly secured to the crank shaft 5, adjacent to the inner end of the gear casing is a fly wheel 16 which, in the present construction, is rigidly secured to a sleeve, or a hub portion, 17 which in turn is keyed to the shaft. This hub portion, or sleeve, has rigidly secured thereto, and preferably formed integral therewith, on that side thereof adjacent to the gear casing, a pinion 18 which meshes with planetary gears 19 carried by a clutch member 20 which, in the form here shown, consists of a friction drum and is rotatably mounted upon the shaft 5, preferably by means of an antifriction bearing 21. The pinions 19 are rigidly secured to spindles, or short shafts, 22 journaled in the drum 20, preferably upon ball bearings 23, and have secured to their other ends pinions 24 which in turn mesh with a gear 25 also journaled on the shaft 5 and having rigidly secured thereto, and preferably formed integral with the hub thereof, a pinion 26 which meshes with a gear 27 carried by a counter shaft 28. The shaft 28 is here shown as a stationary shaft having at its outer end a head 29 which is mounted in the end plate 9 of the gear casing and having its inner end mounted in the end of a supporting arm 30 which extends inwardly from the plate 9 and is so shaped as to extend about the gear 27. The gear 27 is rigidly secured to a sleeve 31 which is rotatably mounted on the shaft 28 and is preferably provided with antifriction bearings. Rigidly secured to and preferably formed integral with the sleeve 31 is a pinion 33 which meshes with a gear 34 mounted upon the sleeve, or elongated hub, 13 of the traction wheel. Cooperating with the clutch member 20 is a second clutch member, which, in the present instance, is in the form of a friction band 35 extending about the drum and provided with the usual operating mechanism, such as the rock arm 36, for tightening the same on the drum.

It will be apparent that when the clutch member or friction band 35 is loose on the drum the drum is free to rotate upon the shaft 5 and, consequently, when the engine is in operation the planetary gears 19 will travel about the pinion 18 due to the resistance offered to the rotation of the pinions 24, which are connected with the wheels and therefore under load. When the clutch is tightened the rotation of the drum 20 is retarded or entirely prevented, thereby retarding or preventing the bodily movement of the planetary gears and causing the same to be rotated about their individual axes by the pinion 18 and the movement thus imparted to the gears 19 is transmitted through pinions 24, gears 25, pinion 26, gear 27 and pinion 33 to gear 34 which is mounted on the hub of the wheel, thereby causing the traction wheel to be rotated. It will be obvious that with this construction either traction wheel can be operated while the other is stationary or either traction wheel may be operated slowly while the other is operated at a higher speed, thus enabling the tractor to be turned under power in either direction.

The clutch members are preferably controlled from the rear ends of the handles by means of which the tractor is guided, and which are shown at 76. To this end the crank arms 36, which are connected with the respective friction bands 35 are connected by rods 37 with levers 38 pivotally mounted on the respective handles 76 and in the present instance mounted on the upper ends of brace bars 39 which extend between the handles 76 and the main frame 1. The levers 38 are further connected, by rods 40, with actuating levers 41 pivotally mounted on the handles 76 near the rear ends thereof and provided with locking dogs 42 which cooperate with two sectors 43 to hold the levers 41 and, consequently, the friction band, in their adjusted positions. By interposing the levers 38 between the friction bands and the actuating levers 41 I am able to multiply the power which is transmitted to the friction band to such an extent that this band can be firmly set upon its drum without applying such force to the lever 41 as to cause the movement of the handle and consequently an interference with the travel of the tractor.

It is desirable that the tractor should be reversible as this adds materially to the ease with which it may be controlled in the field and avoids the necessity of dragging the same rearwardly by hand, which is not infrequently necessary with tractors of this type. To accomplish the reversal of the tractor I have mounted the gear 34 on the elongated hub 13 of the wheel for movement lengthwise thereof but have splined the same to this hub, as shown at 44, so that it can have no rotation independently thereof. By moving the gear 34 lengthwise of the hub 13, from the position shown in Fig. 4, it may be caused to mesh with an intermediate idle gear 45 which in turn meshes with a pinion 46 secured to the sleeve 31 and movement is thus transmitted from the sleeve to the hub 13 in a reverse direction. The gear 34 may be shifted in any suitable manner but it is preferably provided with a grooved hub 47 to receive the arms of a yoke 48 to the upper end of which is secured a pin 49 slidably mounted in the wall of the casing and connected at its outer end with a lever 50, which is pivotally mounted on a stud 51 mounted on the gear casing. The connection between the end of the pin 49 and the lever 50 is preferably a slotted one to permit of the relative movement of the parts and that end of the lever opposite the pin 49 is connected by a rod 52 with an operating lever 53 mounted at the rear of the engine. This operating lever is connected with the yokes of the shiftable gears of both transmission mechanisms so that both gears may be shifted simultaneously.

The space between the end portion of the shaft 5 and the outer end of the sleeve, or elongated hub, 13 of the wheel is preferably closed by a rim, or collar, 54 which is held in position by a resilient ring 55. This collar may be provided with a channel 56 to receive a suitable packing, such as felt, and thus establish a dust tight joint between the collar and the shaft and, if desired, this packing may be saturated with oil to provide lubrication. I have also shown a collar 57 secured to the end plate 9 of the casing and extending about the hub of the wheel to form a tight joint at this point and this collar may also be provided with a channel, as shown at 58, to receive a packing similar to that inserted in the collar 54. Because of different field conditions, such as different spacing of rows of plants and the like, it is desirable that the width of the tread of the tractor should be variable so that it can be accommodated to the varying conditions of service. In the present construction I have so constructed the traction wheels that a wide variation in the tread may be secured. As shown more particularly in Fig. 6, the part 12 of the wheel which carries the hub 13 has rigidly secured thereto a body portion, which is here shown in the form of a disk 60 bolted at its inner edge to the part 12 and having its outered edge offset from the plane of the inner edge thereof so as to give the disk a dish-shape. To the outer edge of the disk is secured the rim 61 which is preferably provided at one edge with a flange 62 which is bolted to the edge of the disk. With the rim secured to the web in such a position that the tread portion thereof will extend inwardly from the flange the narrowest tread is secured. By disconnecting the disk from the part 12 of the wheel and reversing the same and again attaching it to the part 12 so that the concave side will face outwardly, the greatest width of tread is secured. To secure lesser variations in the width of the tread the rim may be detached from the disk and reversed so that the tread will extend outwardly from the flange instead of inwardly, thereby providing additional variations in the width of the tread. It will be apparent that by arranging the wheel at one side of the machine in one position and the wheel on the other side of the machine in another position additional variations in the width of the tread may be secured. Consequently, the machine can be adapted to almost any condition existing in the field.

I have also provided means whereby the tractor may be used for power purposes with the traction wheels resting upon the ground, thus avoiding the necessity of jacking up the wheels, or otherwise placing the machine in an abnormal position. It will be noted from Figs. 4 and 6 that the end of the shaft 5 projects beyond its bearing in the elongated hub 13 and is reduced so that it is of a diameter somewhat less than the bore of said hub. To utilize the tractor as a power plant I mount upon one of the reduced ends of the shaft 5 a hub 63, which is keyed thereto, and rigidly secure to said hub a belt pulley 64. With the arrangement shown in Fig. 6 the belt can only be applied to the pulley when the wheel is in one of its inner positions, but obviously if it seemed desirable, the hub, or pulley support, could be lengthened. Preferably one end only of the shaft is provided with a pulley, and, if desired, the other end may be designed to receive a crank for rotating the shaft to start the engine. As shown in Fig. 4 this is accomplished by providing the end of the shaft with a transverse pin 65 the ends of which form lugs to engage slots in the socket of the crank, which is not here shown.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a tractor, a frame, a traction wheel mounted on each side of said frame, an engine mounted on said frame, a crank shaft for said engine rotatable relatively to said wheels about an axis coincident with the axes thereof, separate transmission mechanisms interposed between the respective wheels and said crank shaft, each of said transmission mechanisms comprising pinions connected respectively with said crank shaft and the wheel and arranged in axial alinement one with the other and gearing connecting said pinions one to the other, and a means to separately control said transmission mechanism.

2. In a tractor, a frame, a traction wheel journaled on each side of said frame and having a hollow head, an engine mounted on said frame, a crank shaft for said engine rotatable relatively to said wheels about an axis coincident with the axes thereof, separate planetary transmission mechanisms interposed between said shaft and the respective hubs, and means to separately control said transmission mechanisms.

3. In a tractor, a frame, a gear casing on each side of said frame, a bearing in each gear casing, traction wheels arranged on the respective sides of said frame and each having a hollow hub journaled in the bearing of the adjacent gear casing, an engine mounted on said frame, a crank shaft for said engine having its end portions journaled in the hubs of the respective wheels, reversible transmission mechanisms interposed between said shaft and the respective hubs, and means to separately control said transmission mechanisms.

4. In a tractor, a frame, a traction wheel journaled on each side of said frame and having a hollow hub, an engine mounted on said frame, a crank shaft for said engine having its end portions journaled in the hubs of the respective wheels, gears secured respectively to said shaft and said hubs, a supporting structure rotatable about the axis of said shaft adjacent to each hub, planetary gears carried by said structures and connected respectively with the gears on said hubs and on said shaft, and means to separately control the rotation of said structures.

5. In a tractor, a frame, a traction wheel journaled on each side of said frame and having a hollow hub, an engine mounted on said frame, a crank shaft for said engine having its end portions journaled in the hubs of the respective wheels, gears secured respectively to said shaft and said hubs, a clutch rotatable about the axis of said shaft adjacent to each hub, planetary gears carried by said clutches and connected respectively with the gears on said hubs and on said shaft, and means to separately control said clutches.

6. In a tractor, a frame, a gear casing on each side of said frame, a bearing in each gear casing, wheels on the opposite sides of said frame and having parts journaled in the respective bearings, an engine mounted on said frame, a crank shaft for said engine, separate transmission mechanisms mounted in the respective gear casings and interposed between said shaft and the respective wheels, and separate clutch mechanisms to connect said shaft with and disconnect the same from the respective wheels.

7. In a tractor, a frame, traction wheels arranged on the opposite sides of said frame, an engine mounted on said frame, a crank shaft for said engine, transmission mechanisms interposed between said shaft and each of said wheels, each of said transmission mechanisms comprising a pinion secured to said shaft, a clutch member rotatable about the axis of said shaft, planetary gears carried by said clutch member and meshing with said pinion, pinions connected with the respective planetary gears, a gear rotatable about the axis of said shaft and meshing with the last mentioned pinion, and a geared connection between said last mentioned gear and the wheel.

8. In a tractor, a frame, traction wheels arranged on the opposite sides of said frame, an engine mounted on said frame, a crank shaft for said engine, transmission mechanisms interposed between said shaft and each of said wheels, each of said transmission mechanisms comprising a pinion secured to said shaft, a clutch member rotatable about the axis of said shaft, planetary gears carried by said clutch member and meshing with said pinion, pinions connected with the respective planetary gears, a gear rotatable about the axis of said shaft and meshing with the last mentioned pinions, a pinion secured to the last mentioned gear, a counter shaft, a gear mounted on said counter shaft and meshing with the last mentioned pinion, a pinion mounted on said counter shaft and rotatable with the gear on said counter shaft, and a gear connected with said wheel and meshing with the pinion on said counter shaft.

9. In a tractor, a frame, traction wheels arranged on the opposite sides of said frame, an engine mounted on said frame, a crank shaft for said engine, transmission mechanisms interposed between said shaft and the respective wheels, each of said transmission mechanisms comprising a pinion secured to said shaft, a clutch member rotatable about the axis of said shaft, planetary gears carried by said clutch member and meshing with said pinion, pinions connected with the respective planetary gears, a gear rotatable about the axis of said shaft and meshing with the last mentioned pinions, a pinion connected with the last mentioned gear, a counter shaft, a sleeve rotatably mounted on said counter shaft, a gear carried by said sleeve and meshing with the last mentioned pinion, a plurality of pinions mounted on said sleeve, a gear connected with said wheel and capable of axial movement relatively thereto, and means for shifting said gear into operative relation with either of the pinions on said sleeve.

10. In a tractor, a frame, a gear casing mounted on each side of said frame and having a bearing, traction wheels having elongated hollow hubs journaled in the respective bearings, an engine mounted on said frame, a gear shaft for said engine having its end portions journaled in the hollow hubs of the respective wheels, transmission mechanisms interposed between said shaft and the respective hubs, and separate means for controlling the respective transmission mechanisms.

11. In a tractor, a frame, a gear casing mounted on each side of said frame and having a bearing, traction wheels having elongated hollow hubs journaled in the respective bearings, an engine mounted on said frame, a gear shaft for said engine having its end portions journaled in the hollow hubs of the respective wheels, transmission mechanisms interposed between said shaft and the respective hubs, separate means for controlling the respective transmission mechanisms, and a driving element mounted on one end of said shaft for rotation independently of said traction wheels.

12. In a tractor, a frame, a gear casing mounted on each side of said frame and having a bearing, traction wheels having elongated hollow hubs journaled in the respective bearings, an engine mounted on said frame, a crank shaft for said engine having its end portions journaled in the hollow hubs of the respective wheels, transmission mechanisms interposed between said shaft and the respective hubs, and a belt pulley having a hub portion keyed to one end of said shaft whereby said pulley will be supported beyond the adjacent wheel.

13. In a tractor, a frame, a gear casing mounted on each side of said frame and having a bearing, traction wheels having elongated hollow hubs journaled in the respective bearings, an engine mounted on said frame, a gear shaft for said engine having its end portions journaled in the hollow hubs of the respective wheels, transmission mechanisms interposed between said shaft and the respective hubs, each of said transmission mechanisms comprising a pinion secured to said shaft, a clutch having one member mounted for rotation about the axis of said shaft, planetary gears carried by said clutch member and meshing with the pinion on said shaft, pinions secured to and rotatable with the respective planetary gears, geared connections between said pinions and the respective hubs, and means independently operating said clutches.

14. In a tractor, a frame, a gear casing mounted on each side of said frame and having a bearing, traction wheels having elongated hollow hubs journaled in the respective bearings, an engine mounted on said frame, a gear shaft for said engine having its end portions journaled in the hollow hubs of the respective wheels, transmission mechanisms interposed between said shaft and the respective hubs, each of said transmission mechanisms comprising a pinion secured to said shaft, a clutch having one member mounted for rotation about the axis of said shaft, planetary gears carried by said clutch member and meshing with the pinion on said shaft, pinions secured to and rotatable with the respective planetary gears, reversible geared connections between the last mentioned pinions and the respective hubs, and means for independently operating said clutches.

15. In a tractor, a frame, a gear casing on each side of said frame, each casing comprising an end plate having a bearing therein, a wheel arranged on each side of said frame and having an elongated hollow hub journaled in the bearing of the adjacent casing, an engine mounted on said frame, a crank shaft for said engine having its ends journaled in said hollow hubs, a pinion secured to said shaft adjacent to each casing, a clutch having one member rotatably mounted about the axis of said shaft, planetary gears carried by said clutch member, a shaft for each of said wheels journaled in said clutch member, pinions secured to the opposite ends of the shafts of the respective gears, a gear rotated about the axis of said crank shaft and meshing with said pinions, a counter shaft having one end mounted in the end plate of said casing, an arm carried by said end plate to support the inner end of said counter shaft, a gear mounted on the hub of said wheel, a pinion mounted on said counter shaft and meshing with the said gear, a geared connection between said last mentioned pinion and the gear which meshes with the pinions on said clutch member, and means for actuating said clutch.

16. In a tractor, a frame, traction wheels mounted on the opposite sides of said frame, an engine, a crank shaft for said engine, separate transmission mechanisms interposed between said crank shaft and the respective traction wheels, each of said transmission mechanisms comprising a clutch, an actuating rod for each of said clutches, handles for guiding said tractors, a lever mounted on each handle and connected with the respective clutch rods, and a clutch operating device mounted on each of said handles near the rear ends thereof and operatively connected with said lever.

In testimony whereof, I affix my signature hereto.

CARL F. RAUEN.